United States Patent
Costa et al.

(10) Patent No.: US 10,477,425 B2
(45) Date of Patent: Nov. 12, 2019

(54) METHOD AND APPARATUS FOR CONNECTIVITY ADJUSTMENT IN A WIRELESS COMMUNICATION NETWORK

(71) Applicant: Huawei Technologies Co., Ltd., Shenzhen (CN)

(72) Inventors: Mario Costa, Helsinki (FI); Philip Ginzboorg, Helsinki (FI); Gunnar Hedby, Kista (SE); Kari Juhani Leppanen, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 15/834,859

(22) Filed: Dec. 7, 2017

(65) Prior Publication Data
US 2018/0139641 A1    May 17, 2018

Related U.S. Application Data

(63) Continuation of application No. PCT/EP2015/062716, filed on Jun. 8, 2015.

(51) Int. Cl.
*H04W 24/10* (2009.01)
*H04W 72/04* (2009.01)
(Continued)

(52) U.S. Cl.
CPC .......... *H04W 24/10* (2013.01); *H04W 24/02* (2013.01); *H04W 72/048* (2013.01); *H04W 72/085* (2013.01)

(58) Field of Classification Search
CPC ... H04W 24/10; H04W 24/02; H04W 72/048; H04W 72/085
See application file for complete search history.

(56) References Cited

U.S. PATENT DOCUMENTS 7,417,972 B2 * 8/2008 Dillinger ............... H04W 24/00
                                                                370/328
9,185,639 B1 * 11/2015 Sherman ............... H04W 48/16
(Continued)

FOREIGN PATENT DOCUMENTS

CN          1819484 A       8/2006
CN         102714536 A      10/2012
(Continued)

OTHER PUBLICATIONS

Godrich et al., "Target Tracking in MIMO Radar Systems: Techniques and Performance Analysis," Proceedings of the IEEE Radar Conference, pp. 1111-1116, (2010).
(Continued)

*Primary Examiner* — Min Jung
(74) *Attorney, Agent, or Firm* — Leydig, Voit & Mayer, Ltd.

(57) ABSTRACT

A computing apparatus configured to communicate with nodes of a wireless communication system. The computing apparatus includes a processor configured to receive a radio link measurement corresponding to a user node. The processor determines a physical disturbance based on the radio link measurement and determines an at risk user node and a time at which the at risk user node is likely to experience a radio link disturbance, based on the physical disturbance. The processor then determines a connectivity adjustment for the at risk user node, and sends the determined connectivity adjustment to the wireless communication system.

20 Claims, 9 Drawing Sheets

(51) Int. Cl.
   *H04W 72/08* (2009.01)
   *H04W 24/02* (2009.01)

(56) References Cited

U.S. PATENT DOCUMENTS

| | | |
|---|---|---|
| 9,453,911 B2* | 9/2016 | Shiba .................... G01S 13/726 |
| 2010/0159832 A1 | 6/2010 | Lagrange et al. |
| 2011/0116480 A1 | 5/2011 | Li et al. |
| 2011/0287778 A1 | 11/2011 | Levin et al. |
| 2011/0312316 A1 | 12/2011 | Baldemair et al. |
| 2012/0238252 A1* | 9/2012 | Levitan ................ H04L 63/102 |
| | | 455/414.1 |
| 2016/0323896 A1 | 11/2016 | Bhattad et al. |

FOREIGN PATENT DOCUMENTS

| | | |
|---|---|---|
| CN | 104205921 A | 12/2014 |
| WO | 2012044863 A1 | 4/2012 |
| WO | 2013178037 A1 | 12/2013 |

OTHER PUBLICATIONS

He et al., "Target Velocity Estimation and Antenna Placement for MIMO Radar With Widely Separated Antennas," IEEE Journal of Selected Topics in Signal Processing, vol. 4, No. 1, (Feb. 2010).
Kay et al., "Fundamentals of Statistical Signal Processing: Estimation Theory", Prentice Hall PTR, (1993).

* cited by examiner

METHOD AND APPARATUS FOR CONNECTIVITY ADJUSTMENT IN A WIRELESS COMMUNICATION NETWORK

CROSS-REFERENCE TO RELATED APPLICATIONS

This application is a continuation of International Application No. PCT/EP2015/062716, filed on Jun. 8, 2015, the disclosure of which is hereby incorporated by reference in its entirety.

TECHNICAL FIELD

The aspects of the disclosed embodiments relate generally to wireless communication systems and in particular to ultra-dense wireless networks.

BACKGROUND

Due to rising rates of mobile device usage, ultra-dense networks (UDN) are being increasingly used to augment the capacity of wireless communication systems. In an ultra-dense network it is important to ensure that the data flowing to and from an active user node is not subjected to significant changes in the channel conditions, such as a sudden significant decrease in the signal to interference plus noise ratio (SINR) of the signal. Since ultra-dense networks operate mainly in LoS conditions, a large vehicle or other physical disturbance passing between the user node and the remote radio unit to which it is connected can cause the radio link to be lost or severely degraded. These unexpected changes in channel conditions may lead to a significant decrease in throughput, increased latency, and an overall poor end-user performance or experienced quality of service (QoS).

Conventional wireless communication systems typically adjust connectivity of a moving user node using handoff or handover techniques, where a user node is moved from one serving access node to another. Conventional systems also detect "blank spots" or areas where there is poor radio coverage and adjust connectivity of user nodes in those areas to improve overall channel quality. However, conventional systems mechanically reposition an antenna in a reactive fashion after degradation of the signal has been detected, and the amount of time taken to physically move an antenna can be quite large resulting in less than optimal system performance. Conventional wireless systems also base detection of disturbances or blank spots on measurements made only by the user nodes so detection is based only on down link measurements. Compensation for disturbances is also typically carried out through adjustments in the user node, thus increasing the power consumption of the user node.

Conventional or state-of-the are solutions operate on a "cell-scale" considering the cell as a whole and are not able to effectively compensate for disruptions of an individual radio link or an individual user node caused by moving physical disturbances. However, ultra-dense network disruptions of individual radio links caused by moving physical disturbances typically have a significant negative impact on user node connectivity. This is because the connection between user nodes and the ultra-dense network is primarily based on low-power and/or high frequency radio-links which operate most effectively in LoS conditions.

Target tracking algorithms based on widely separated antennas are useful in detecting and tracking moving physical disturbances present in many ultra-dense networks. However, conventional target tracking methods are limited to tracking the current location of objects and do not offer solutions for predicting future disruptions of the radio links between user nodes and the ultra-dense network. Detection of degradations in channel quality of the radio links has typically been done using measurements from the user node alone and is thus unable to detect or predict radio link degradations that will be caused by the moving physical disturbances.

Thus there is a need for improved methods and apparatus for detecting, tracking, and compensating for disturbances of radio link quality in ultra-dense network caused by physical disturbances. There is also a need for improved methods and apparatus that can track physical disturbances and proactively adjust the connectivity of user nodes to avoid loss of connectivity or significant degradation of the QoS provided to the user nodes.

SUMMARY

It is an object of the present disclosure to provide apparatus and methods that can detect and track moving disturbances within a wireless communication network and automatically adjust connectivity between user nodes and the network to avoid connection losses and maintain a predetermined quality of service.

According to a first aspect of the present disclosure the above and further objects and advantages are obtained by a computing apparatus for a radio access network, wherein the computing apparatus is configured to communicate with a wireless communication system. The computing apparatus includes a processor configured to receive a radio link measurement corresponding to a user node. The processor determines a physical disturbance based on the radio link measurement. An at risk user node is determined along with a time at which the at risk user node is likely to experience a radio link disturbance based on the physical disturbance. The processor then determines a connectivity adjustment for the at risk user node, and sends the connectivity adjustment to the wireless communication system.

In a first possible implementation form of the computing apparatus according to the first aspect the processor is configured to receive an uplink radio link measurement and a downlink radio link measurement from the user node. Improved radio link monitoring can be achieved in this manner.

In a second possible implementation form of the computing apparatus according to the first aspect as such or to the first implementation form of the first aspect the processor is configured to identify the physical disturbance as a moving physical disturbance by identifying a group of user nodes having well correlated velocities, wherein an average velocity of the group of user nodes is greater than a predetermined threshold value. In this manner, a more reliable identification of moving physical disturbances is obtained.

In a third possible implementation form of the computing apparatus according to the first aspect as such or to the first or second possible implementation forms of the first aspect the processor is configured to track the moving physical disturbance by sending one or more messages via the wireless communication system to the user nodes requesting the user nodes to transmit mobility beacons. Tracking of the moving physical disturbances may be improved in this manner.

In a fourth possible implementation form of the computing apparatus according to the first aspect as such or to the first to third implementation forms of the first aspect the processor is configured to determine the physical disturbance based on packet losses in the uplink and/or downlink corresponding to the user node. Detection of physical disturbances may be improved in this manner.

In a fifth possible implementation form of the computing apparatus according to the first aspect as such or to the first through fourth implementation forms of the first aspect the processor is configured to determine a physical disturbance based on detection of line of sight and non-line of sight radio link measurements between the user node and a remote radio unit. Detection of physical disturbances may be improved in this manner.

In a sixth possible implementation form of the computing apparatus according to the first aspect as such or to the preceding first through fourth implementation forms of the first aspect the radio access network comprises an antenna array coupled to an access node and the physical disturbance is a moving physical disturbance, wherein the processor is configured to track the moving physical disturbance by sending one or more messages to the access node requesting the access node to illuminate the moving physical disturbance with radio waves, and track the moving physical disturbance based on monostatic or bistatic radar computations. Tracking of the moving physical disturbances may be improved in this manner.

In a seventh possible implementation form of the computing apparatus according to the first aspect as such or to any of the preceding first through sixth implementation forms of the first aspect the processor is configured to adjust connectivity by connecting the at risk user node to a remote radio unit where a line of sight radio link between the at risk user node and the remote radio unit will be protected from disruption by the physical disturbance. Loss of connectivity of an at risk user node may be avoided in this manner.

In an eighth possible implementation form of the computing apparatus according to the first aspect as such or to any of the preceding first through sixth implementation forms of the first aspect the processor is configured to adjust connectivity by adapting a rate of channel state information measurements. Loss of connectivity of an at risk user node may be avoided in this manner.

In a ninth possible implementation form of the computing apparatus according to the first aspect as such or to any of the preceding first through sixth implementation forms of the first aspect loss of connectivity of an at risk user node may be avoided by configuring the processor to adjust connectivity by increasing throughput and buffering data before a radio link disturbance occurs.

In a tenth possible implementation form of the apparatus according to the first aspect as such or to any of the preceding first through sixth implementation forms of the first aspect the processor is configured to adjust connectivity by adjusting one or more of the modulation and coding scheme, coding rate, and number of resource elements associated with the at risk user node. Loss of connectivity of an at risk user node may be avoided in this manner.

In an eleventh possible implementation form of the computing apparatus according to the first aspect as such or to any of the preceding first through sixth implementation forms of the first aspect the processor is configured to adjust connectivity by sending messages to the at risk user node requesting data traffic to be offloaded to an alternate radio access technology. Loss of connectivity of an at risk user node may be avoided in this manner.

In a twelfth possible implementation form of the computing apparatus according to the first aspect as such or to any of the preceding first through eleventh implementation forms of the first aspect the processor is configured to send measurement signals to nodes of the wireless communication system, wherein the measurement signals comprise the type of measurements to be taken, and the type of measurements comprise one of an uplink radio measurement, a downlink radio measurement and a signal to interference plus noise ratio. Radio link measurements may be improved in this manner.

In a thirteenth possible implementation form of the computing apparatus according to the first aspect as such or to any of the preceding first through sixth implementation forms of the first aspect the processor is configured to maintain mobility models of the one or more user nodes and the one or more physical disturbances based on the received user node positions and the determined physical disturbances, wherein the mobility models are maintained based on Kalman filtering. Improved predictions of future radio link disturbances may be obtained.

In a fourteenth possible implementation form of the computing apparatus according to the first aspect as such or to the first through sixth possible implementation forms of the first aspect the radio access network comprises a plurality of remote radio units, the computing apparatus comprises a remote radio unit, and the processor is configured to send information about the determined one or more physical disturbances to another remote radio unit. The allows for improved detection of physical disturbances.

In a fifteenth possible implementation form of the computing apparatus according to the first aspect as such or to the first through sixth possible implementation forms of the first aspect the processor is configured to send information about alternate remote radio units to the at risk user node. Information on alternate radio access technology can reduce the potential for an interruption in connectivity.

In a sixteenth possible implementation form of the computing apparatus according to the first aspect as such or to the first through fifteenth possible implementation forms of the first aspect the processor is configured to receive a user node position corresponding to the radio link measurement and determine the physical disturbance based on the user node position. This allows for detecting and tracking physical disturbances based on position and velocity information about the user node. The user node positions facilitate determination of when a line of sight radio link will be interfered with or blocked by a physical disturbance.

In a second aspect of the present disclosure the above and further objects and advantages are obtained by a method for use in a wireless communication network. A radio link measurement is received. A physical disturbance is then determined based on the radio link measurement. The determined physical disturbance is used to determine an at risk user node, and a time at which the at risk user node is likely to experience a radio link disturbance. A connectivity adjustment is determined based on the at risk user node. The determined connectivity adjustment is then sent to the wireless communications network. The connectivity adjustment is configured to prevent the at risk user node from losing connectivity or experiencing reduced radio link quality.

In a first possible implementation form of the method according to the second aspect the method includes receiving a user node position corresponding to the radio link measurement, and determining the physical disturbance based on the user node position. This allows for detecting and tracking physical disturbances based on position and velocity information about the user node. The user node positions facilitate determination of when a line of sight radio link will be interfered with or blocked by a physical disturbance.

In a third aspect of the present disclosure the above and further objects and advantages are obtained by a computer program product including non-transitory computer program instructions that when executed by a processing apparatus cause the processing apparatus to perform the method according to the second aspect of the present disclosure.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed embodiments, for which reference should be made to the appended claims. Additional aspects and advantages of the disclosure will be set forth in the description that follows, and in part will be obvious from the description, or may be learned by practice of the embodiments. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion, the embodiments will be explained in more detail with reference to the example embodiments shown in the drawings, in which.

DETAILED DESCRIPTION OF THE DISCLOSED EMBODIMENTS

Figure 1A:
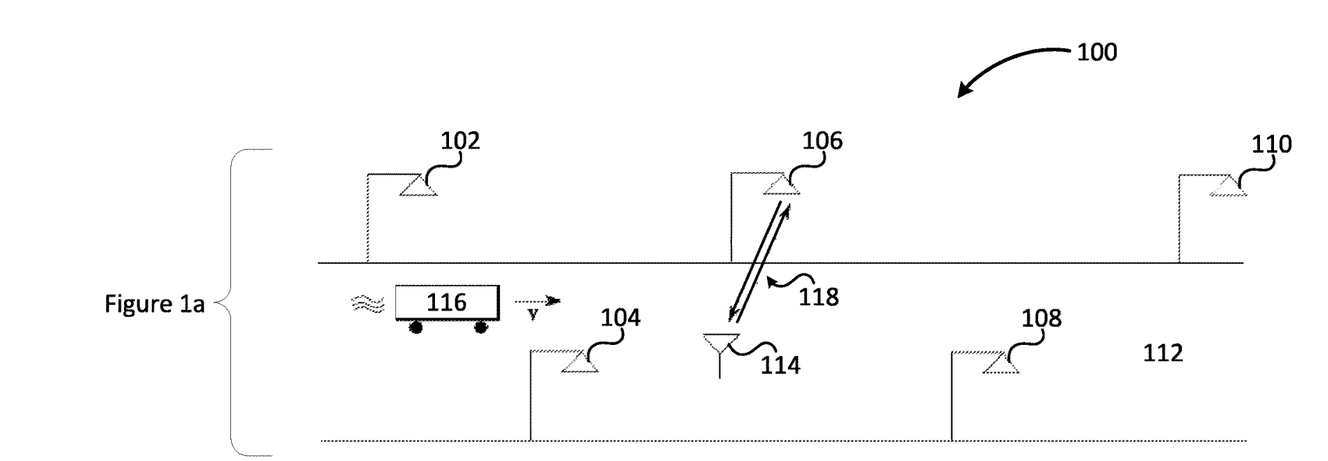
FIGS. 1a and 1b illustrate a pictorial diagram of an ultra-dense network appropriate for practicing aspects of the disclosed embodiments.
Figure 1B:
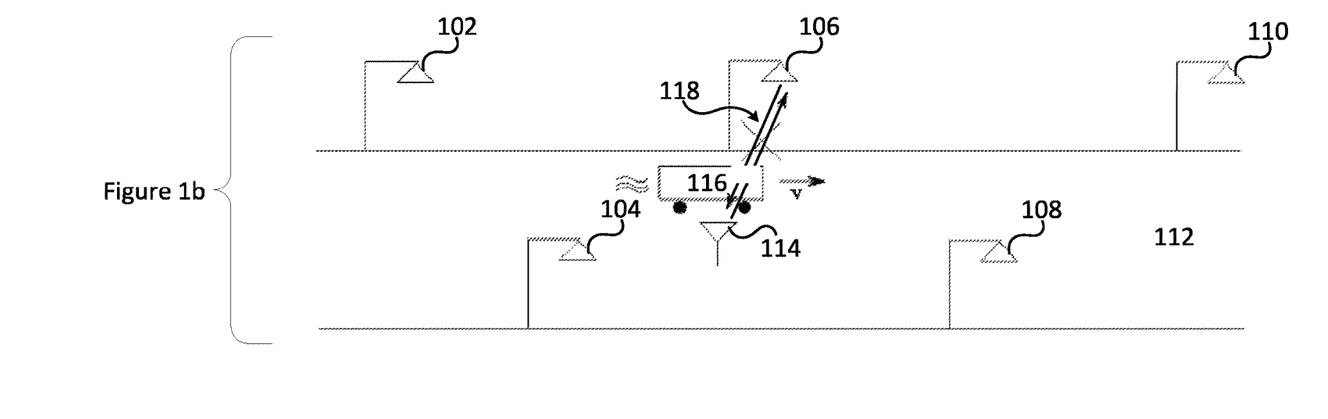

FIGS. 1a and 1b illustrate the effects of moving physical disturbances in an exemplary ultra-dense network 100. An ultra-dense network is a wireless network based on many low power access nodes (AN) where each access node may include a controller and one or more remote radio units (RRU).

As illustrated in the example of FIGS. 1a and 1b, the ultra-dense network 100 includes remote radio units 102, 104, 106, 108, 110. The radio units in this example can be deployed on lampposts or other appropriate structures along a street 112 or other thoroughfare, for example. The remote radio units 102, 104, 106, 108, 110 may form a single access node or may all be controlled by separate access nodes that are part of one ultra-dense network or communication system. While the term remote radio unit is used herein to refer to a radio frequency transceiver unit operating as part of an access node, it will be readily recognized that the remote radio unit may be located remote from other components of the access node or collocated with other components of the access node without straying from the spirit and scope of the disclosed embodiments.

The term remote radio units used herein refers to a radio frequency transceiver that may be controlled by an access node and used by the access node to communicate with mobile devices over an air interface or radio link. The remote radio unit is typically located remotely or separate from the controller and other components of the access node but in certain installations may be collocated with the access node. The remote radio unit in an ultra-dense network may be distributed, for example on lampposts along a street, where communication between the remote radio unit and user equipment (UE), also referred to herein as user node, is mainly in line of sight (LoS) conditions. The access nodes are often equipped with antenna arrays or multiple remote radio units which may be used for multi-input multi-output (MIMO) wireless communications and which also provide highly accurate positioning of mobile or static user nodes. A user node as used herein refers to any device equipped for wireless communications, such as a cell phone or tablet computer, and may include stationary devices which are affected by changing signal conditions in the ultra-dense network.

In an ultra-dense network, changes in channel conditions are mainly due to user node movement or moving physical disturbances. In particular, moving disturbances may be classified as objects that shadow the LoS component between the user node and the serving remote radio unit or access node. Examples of such objects include cars, trucks, buses, or people. These objects may also be carrying user nodes that are not part of the same radio access network and may therefore become a source of significant interference.

FIGS. 1a and 1b illustrate the same ultra-dense network 100 and street 112 at two different points in time. In FIG. 1a, an earlier time is represented where a moving disturbance 116 is entering the street 112 from the left and travelling in a direction indicated by arrow v. FIG. 1b illustrates the ultra-dense network 100 at a later point in time where the moving physical disturbance 116 has traveled to a point near the center of the street 112. The moving disturbance 116, depicted as a truck or other moving vehicle in this example, is traveling along the street 112 where a user node 114 is being serviced by remote radio unit 106 of the ultra-dense network 100. While the examples disclosed herein are illustrated with an ultra-dense network deployed along a street and with physical disturbances depicted as moving vehicles, it should be noted that these examples are presented as an aid to understanding only and those skilled in the art will readily recognize that the methods and apparatus may be advantageously employed in other types of wireless networks deployed in other types of areas, such as for example a shopping mall, large stadium, or other wireless network deployment.

The user node 114 is connected by a radio link 118 to a remote radio unit 106 which is part of the ultra-dense network 100. As the moving physical disturbance 116 travels along the road 112 it moves from the position illustrated in FIG. 1a to the position illustrated in FIG. 1b. When the moving physical disturbance 116 passes between the user node 114 and the remote radio unit 106 the moving physical disturbance 116 obstructs the radio link 118, which may be a LoS radio link, connecting the user node 114 with remote radio unit 106. When the moving physical disturbance obstructs the radio link 118, the radio link 118 will experience a significant change in channel quality, such as a decreased SINR, caused by the moving physical disturbance 116 blocking the LoS radio link 118.

Figure 2:
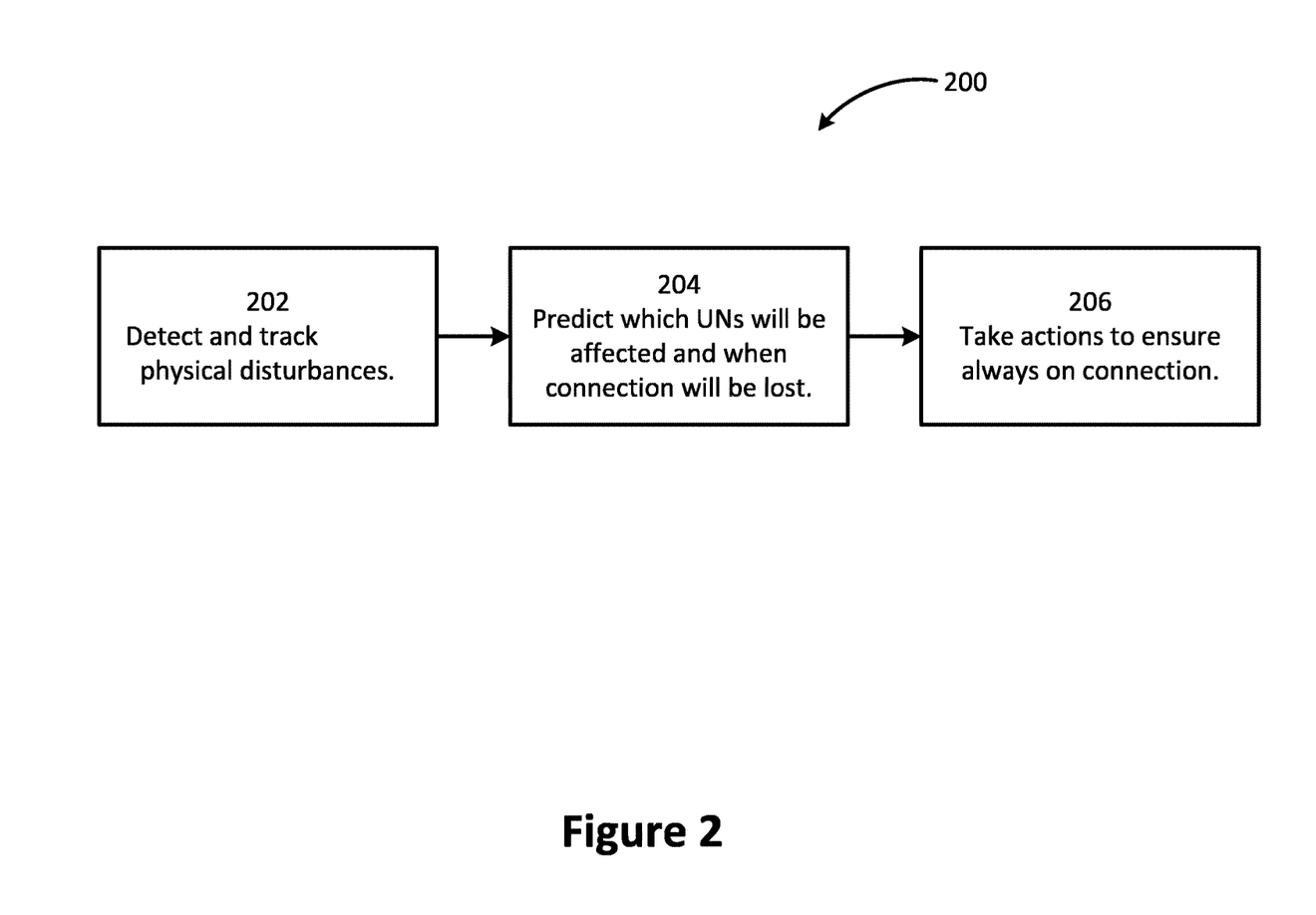
FIG. 2 illustrates a block diagram of a method for proactively adjusting connectivity in wireless communication networks incorporating aspects of the disclosed embodiments.

FIG. 2 illustrates a flow chart of an exemplary method 200 for adjusting the connectivity of a user node, such as the user node 114 described above, that may be used to prevent deterioration or loss of connectivity caused by a physical disturbance, such as the physical disturbance 116 described above with respect to FIGS. 1a and 1b. The exemplary method 200 begins by detecting and tracking 202 potential disturbances to the connectivity of user nodes. It should be noted that movement of the physical disturbance is relative to the radio link between a user node and an access node.

For example, if a physical disturbance is geographically stationary and the user node is moving, the physical disturbance may be treated as moving with respect to the radio link. Once the physical disturbances have been detected and their movements tracked 202, predictions may be made 204 as to which user node will have their radio links affected by the disturbances and when their connectivity is expected or likely to be deteriorated or lost. Actions or adjustments to the connectivity of the affected user node can then be taken 206 to ensure always on connectivity or to avoid having disturbances adversely affect the user node QoS. The actions or procedures are implemented on a radio access level, i.e. adjustments are made to the air interface between the user node and the associated remote radio unit or access node in the ultra-dense network. In certain embodiments, the actions include sending specific messages to the user nodes. It is important to predict the point in time when the user node will be affected.

For example, when a user node that is uploading a large block of data, such as posting an HD video to a cloud service, is expected to be subjected to loss of connectivity due to a physical disturbance or moving physical disturbance, the user node can have additional radio resources allocated to it so that the upload can be completed before the radio link or connectivity is deteriorated by the physical disturbance. However, accelerating a data transfer is only effective if the connectivity loss is predicted early enough. The exemplary method 200 provides the ability to ensure always-on connectivity of user nodes in a radio access network such as an ultra-dense network even when moving physical disturbances are present.

Figure 3:
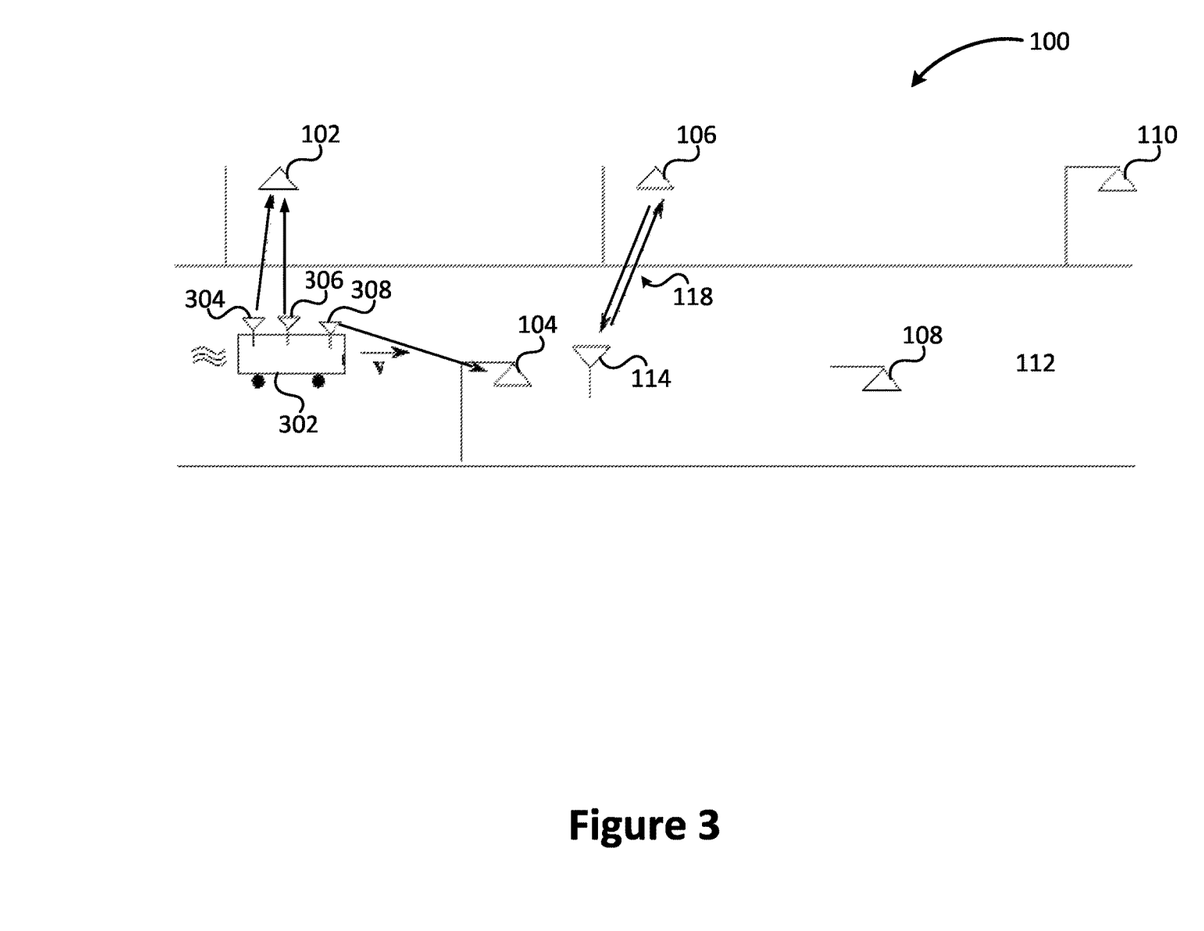
FIG. 3 illustrates a pictorial diagram of a wireless communications system incorporating aspects of the disclosed embodiments.

Detecting and tracking 202 the physical disturbances can be achieved in a number of ways. One approach is based on continuously tracking the positions of user nodes and thereby obtaining both position and velocity information about user nodes in the coverage area of the ultra-dense network or in the coverage area of other wireless networks with which the ultra-dense network is exchanging data. Physical disturbances can then be detected by grouping user nodes based on their velocity. A potential physical disturbance can be detected by identifying a group of user nodes that all have essentially the same velocity. FIG. 3 illustrates an exemplary embodiment of a method for detecting physical disturbances by grouping user nodes based on their position and/or velocity.

In FIG. 3, the ultra-dense network 100 and street 112 described above and with reference to FIGS. 1a and 1b is shown with a different physical disturbance 302. In this example, the physical disturbance 302, which may be a vehicle such as a car or a bus, is travelling along the street 112 in a direction indicated by the arrow v and is carrying a group of three user nodes 304, 306, 308. Two of the user nodes 304, 306 are connected to the ultra-dense network 100 through remote radio unit 102. The third user node 308 is connected to the ultra-dense network 100 through remote radio unit 104. The velocities of the three user nodes 304, 306, 308 associated with the physical disturbance 302 will be well correlated with each other and with the velocity of the physical disturbance 302. In certain circumstances the velocity of each user node 304, 306, 308 may be slightly different than the velocity of the physical disturbance 302 such as when the user node 304, 306, 308 is being held by occupants of a moving vehicle.

The velocities of the user nodes 304, 306, 308 and the velocity of the moving physical disturbance 302 may also vary over time such as when the moving physical disturbance 302 is in stop and go traffic or traveling on a city street. However, when a group of user nodes 304, 306, 308 are being carried by a moving physical disturbance 302 there will be a detectable correlation between the user nodes 304, 306, 308 in the group and the velocity of the moving physical disturbance. For example, the average velocity of the three user nodes 304, 306, 308 will over time approach the average velocity of the moving physical disturbance 302 and thus may be described as being well correlated.

Grouping user node with well correlated velocities together results in a group of three user nodes 304, 306, 308 as illustrated in FIG. 3. The velocity, or average velocity of the group, can then be compared to a predetermined threshold value, such as for example 1.4 meters per second, and used to identify this group of user nodes 304, 306, 308 as a car, bus, or other moving physical disturbance. A prediction can then be made based on the direction and velocity of the detected physical disturbance 302 as to whether or not the radio links of another user node, such as user node 114, connected to the ultra-dense network 100 are likely to experience a disruption of radio access, or when the possible disruption will occur.

In the illustrated embodiment shown in FIG. 3, it is likely that the physical disturbance 302 will continue traveling in the direction indicated by the arrow v and will eventually pass between the user node 114 and the access node 106 thereby disturbing the radio link 118. Proactive adjustment of the radio access of user node 114 can be taken before the disruption occurs to prevent disruption of service.

For example, a signal or message can be sent to the user node 114 directing it to connect to remote radio unit 104 instead of remote radio unit 106 to which it is currently connected. Alternatively, a signal or message can be sent to the ultra-dense network 100 to have the ultra-dense network 100 hand off user node 114 from remote radio unit 106 to remote radio unit 104. In this manner, by effectuating the hand off in advance of the potential disruption, the physical disturbance 302 will not disrupt radio access of user node 114.

In certain embodiments, it is advantageous to group user nodes based on their position or based on a combination of velocity and position. To ease tracking of a moving physical disturbance such as physical disturbance 302, it may be advantageous to send messages to the user nodes 304, 306, 308 directing them to turn on mobility beacons when they are so equipped.

Physical disturbances can also be detected by monitoring the quality of radio links connecting user nodes to the communication network. This is advantageous for example when a physical disturbance is not carrying any wireless capable devices that are connected to the ultra-dense network, such as ultra-dense network 100. The quality of radio links may be determined by measurements made by either the user node or access node, which allows taking a radio link measurement ($R^{UL}_U$) of the uplink (UL) as well as taking a radio link measurement ($R^{DL}_U$) of the downlink (DL). These measurements may then be used to determine various link conditions such as LoS/non-line of sight (NLoS), or lost uplink/downlink packets. A variety of values obtained from either the user node or access node may be used to determine link condition such as channel state information (CSI), SINR, block error rate (BLER), or other appropriate values that may be significantly affected by a physical disturbance of the radio links.

Figure 4A:
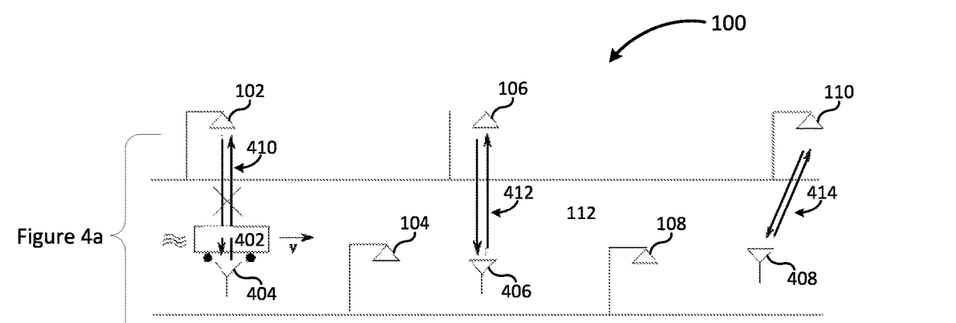
FIGS. 4a-4c illustrate pictorial diagrams of an ultra-dense wireless network incorporating aspects of the disclosed embodiments.
Figure 4B:
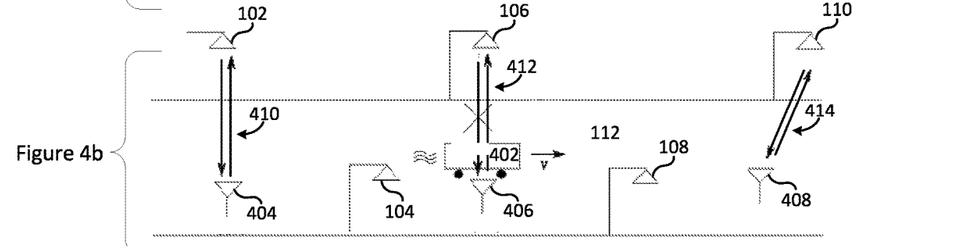
Figure 4C:
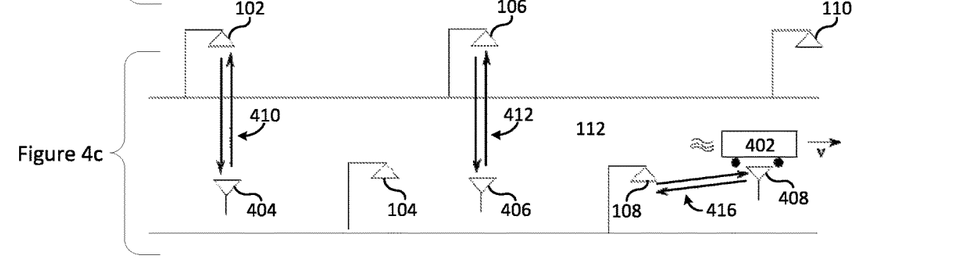

FIGS. 4a, 4b and 4c illustrate pictorial diagrams showing one embodiment of a method for detecting and tracking a physical disturbance 402 through the use of radio link measurements made in a communication network. The method illustrated in FIGS. 4a-4c shows the exemplary ultra-dense network 100 and street 112 described above and with reference to FIGS. 1a-1b. Each of the FIGS. 4a, 4b and 4c depicts the same ultra-dense network 100 and street 112 at three different points in time, thus illustrating a physical disturbance 402 moving down the street 112.

At a first point in time as illustrated in FIG. 4a, the physical disturbance 402, which in this example is moving, passes through the LoS radio link 410 that is connecting user node 404 to remote radio unit 102. The physical disturbance 402 blocks the LoS radio link 410 thereby causing a detectable disturbance to the LoS radio link 410. Making predictions based on a single data point may be unreliable, thus in certain embodiment information about a prior moving physical disturbance may be used to augment detection and tracking of the physical disturbance 402.

For example on a busy street, information about a truck or large vehicle in front of the physical disturbance 402 may be useful. In FIG. 4a, the physical disturbance 402 is illustrated as a vehicle traveling in a direction indicated by arrow v. It should be noted that the physical disturbance 402 need not be a vehicle and could alternatively be any physical disturbance capable of causing changes in channel conditions of a radio link, such as radio links 410, 412, 414, or 416 illustrated in FIGS. 4a-4c.

At a later point in time, as depicted in FIG. 4b, the physical disturbance 402 has traveled along the street 112 to a point where it disrupts the radio link 412 when it passes between user node 406 and remote radio unit 106 to which it is connected. Information collected about the disturbance of the two radio links 410, 412 may be used for example to predict a future disruption of other radio links in the ultra-dense network 100. FIGS. 4a-4c illustrate a situation where it is likely that the radio link 414 connecting user node 408 to the communication network through remote radio unit 110 will be disturbed at a predictable point in time by the physical disturbance 406.

Once a prediction has been made, action can be taken to avoid disruption of radio service to the user node 408. Referring to FIG. 4c, at a point in time prior to the physical disturbance 402 passing between user node 408 and remote radio unit 110, which would disturb the radio link 414, the user node 408 may be directed to hand off or connect to remote radio unit 108 instead of remote radio unit 110 via radio link 416. By handing off user node 408 from remote radio unit 110 to remote radio unit 108 prior to the physical disturbance 402 passing between user node 408 and remote radio unit 110, disruption of service for the user node 408 may be avoided.

In one embodiment, the handoff may be accomplished in any suitable manner, such as by sending a message to the ultra-dense network 100. The ultra-dense network 100 can effectuate the handoff of the user node 408 from remote radio unit 110 to the remote radio unit 108. Alternatively the handoff may be initiated by sending a message directly to the user node 408.

Physical disturbances may be detected and tracked using various means. A group of user nodes identified as having well correlated velocities as described above may be requested to transmit mobility beacons to make it easier to track the physical disturbance they are associated with. Alternatively, a physical disturbance may be illuminated with radio waves or radio energy by an access node equipped with appropriate antennas, such as an antenna array or multiple remote radio unit. As another example, specific waveforms optimized for positioning purposes may be used to illuminate the physical disturbances. Further, techniques stemming from monostatic or bistatic radar may be employed for detection and tracking of the physical disturbance.

When tracking physical disturbances in an ultra-dense network 100, it is desirable in certain embodiments to maintain mobility models for both the user node and the physical disturbances. These mobility models are configured to provide estimates of movements of the user node and physical disturbances such as estimates of position, velocity, and/or acceleration. These mobility models may be used to predict which radio links and user node will be affected and when disruptions of the associated radio links may occur. Various signal processing algorithms may be beneficially applied to solve the mobility modeling problem, including for example, Kalman filtering.

Detection and tracking of physical disturbances allows prediction of when a disruption of the connection between a user node and the associated access node, or more specifically the associated remote radio unit, is imminent. To prevent disruption of the radio link and a corresponding reduction in the QoS experienced by the user node, the ultra-dense network can make adjustments to connectivity within the ultra-dense network. When it is determined that a moving physical disturbance will block or interfere with an existing LoS radio link, the affected user node can be connected to an alternate remote radio unit where the LoS connection will not be disrupted. Switching the connection in this way may be accomplished by sending signals or messages to the access node and is usually transparent to the user node. Alternatively, signals or messages may be sent to the user node directing it to switch to a different remote radio unit or to use an alternate radio access technology such as for example switching from the ultra-dense network to an available Wifi network. The rate of CSI measurements can be increased prior to disruption of the connection in order to provide smooth variation of the CSI and thereby making adaptive adjustment of modulation and coding schemes more efficient.

In certain situations a user node may be uploading or downloading a large block of data. When this occurs throughput for the affected user node can be increased and/or data buffering can be implemented in a fashion determined to account for the expected time and duration of the disruption. In certain embodiments it is advantageous to adapt the modulation and coding scheme to maintain latency and throughput requirements previously agreed upon with the user node. For example, a low order modulation scheme with increased coding gain can be used to maintain the BLER. Additional radio resources may then be assigned to maintain throughput. Alternatively, it may be possible to inform a user node when a disruption of service is imminent. The user node can then be requested to offload its data traffic to an alternate radio access technology (RAT).

For example, there may be a WiFi hotspot available that is capable of handling the data transfer required by the user node. The user node may be directed to use a specific alternate radio access technology by the ultra-dense network or alternatively, the user node may be directed to search for an alternate radio access technology on its own.

In certain embodiments, it is advantageous to have the ultra-dense network or other wireless network send a message to an at risk user node informing the at risk user node of the time and duration of an imminent or likely radio-link disruption. When this is done the message sent to the user node may contain the expected time and expected duration of the radio link disruption as well as information about alternative remote radio units or radio access technology that will not experience a disruption during the same period of time. Alternatively, the ultra-dense network may send the location of alternative remote radio units to the user node in order to facilitate the directional transmission, and decrease the delay of the overall acquisition phase. This could be useful, for example, in millimeter wave communications. The user node can then offload its data to one of the alternate remote radio units or radio access technology. The message sent by the radio access network to the at risk user node may also request that the user node choose between buffering its data or making the radio link more robust by modifying the MCS being used.

Figure 5:
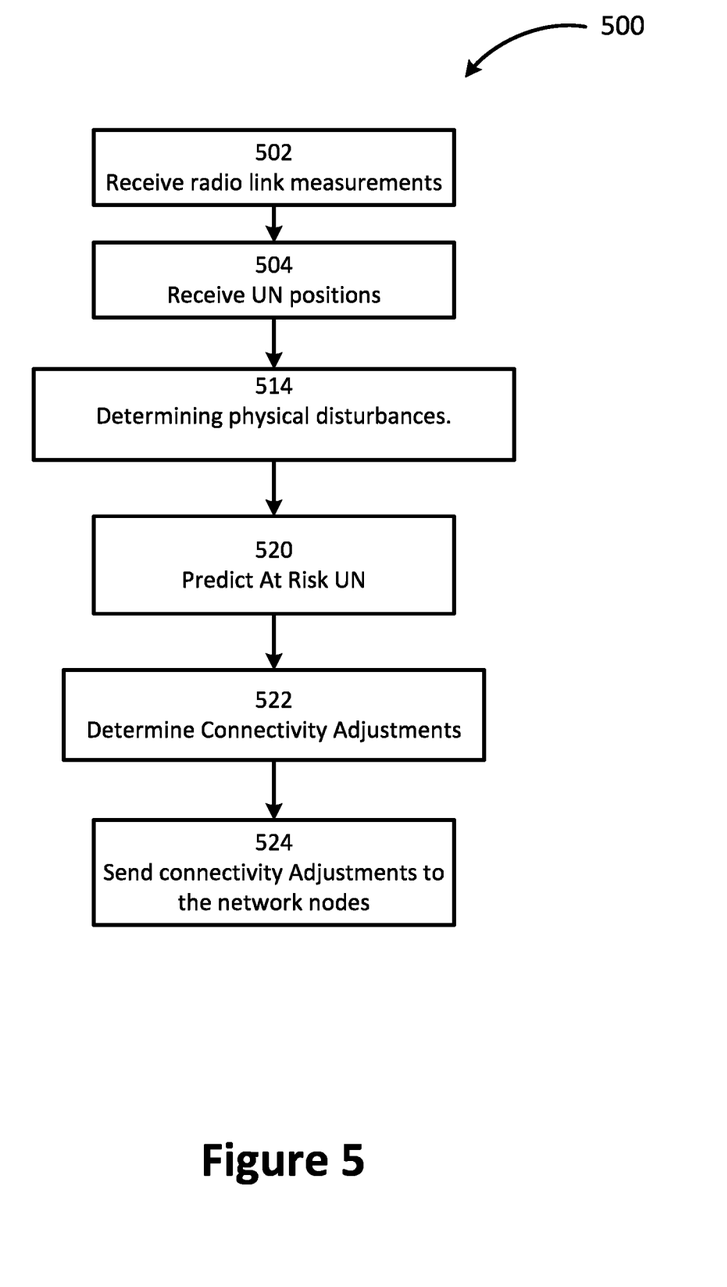
FIG. 5 illustrates a flow chart of an exemplary method for proactively adjusting connectivity in a wireless network incorporating aspects of the disclosed embodiments.

FIG. 5 illustrates a flow chart of an exemplary method for predicting disturbances and proactively adjusting connectivity in a wireless communication system. In one embodiment current radio link measurements $R_U$ are received 502. The radio link measurements $R_U$ provide information about the link quality between user nodes and remote radio units in the wireless network.

As an aid to understanding, some of the inputs and output from the steps in the exemplary method 500 will be represented using vector notation. However, this notation should not be interpreted as requiring implementations to use vector or matrix computations or to complete a particular step on all elements of a vector before proceeding to the next step. For example, those skilled in the art will readily recognize that any type of collection may be advantageously employed, and all steps of the exemplary method 500 may be performed on a first element or first few elements of the collections before completing the steps on other elements of the collections or vectors.

For example, the received radio link measurements may be represented using vector notation as $[R_{U11}, R_{U12}, \ldots R_{U1n}; R_{U21}, R_{U22}, \ldots R_{U2n}; R_{Um1}, \ldots R_{Umn}]$, where $R_{Uij}$ represents the radio link measurement between an $i^{th}$ user node and a $j^{th}$ access node; the total number of user nodes is represented as m, and the total number of remote radio units is represented as n. The radio link measurements $[R_{U11}, R_{U12}, \ldots R_{U1n}; R_{U21}, R_{U22}, \ldots R_{U2n}; R_{Um1}, \ldots R_{Umn}]$ are associated with one or more user nodes $[U_1, U_2, \ldots U_m]$, where a user node may have an UL radio measurement, $R^{UL}_{Ui}$, and a DL radio measurement, $R^{DL}_{Ui}$ associated with each remote radio unit, the DL measurement, $R^{DL}_{Ui}$, may be made at the user node and the uplink measurement, $R^{UL}_{Ui}$, may be made at the access node associated with the remote radio unit. Each radio link measurement $R_U$ can also include values that indicate the quality and nature of the radio link. For example the radio link measurements may include a SINR, CSI, LoS/NLoS, BLER, and other appropriate measurements.

Once the radio link measurements are received 502, the positions of the user node being serviced may also be received 504. The received user node positions may be represented in vector notation as $[P_{U1}, \ldots P_{Un}]$.

Physical disturbances $[P_{D1}, P_{D2}, \ldots PD_i]$, such as the physical disturbances 116, 302, 402 described above, are determined 514. In one embodiment, the physical disturbances 116 are determined 514 based on the radio link measurements $[R_{U11}, R_{U12}, \ldots R_{U1n}; R_{U21}, R_{U22}, \ldots R_{U2n}; R_{Um1}, \ldots R_{Umn}]$. Alternatively, in one embodiment, determining the physical disturbances 116 can be based on the user node positions $[P_{U1}, \ldots P_{Un}]$.

A prediction 520 of an at risk user node is made. The prediction 520 of potential or likely link disturbances may be accomplished based on the determined physical disturbances $[PD_1, PD_2, \ldots PD_i]$, the received user node positions $[P_{U1}, \ldots P_{Un}]$ and the radio link measurements $[R_{U11}, R_{U12}, \ldots R_{U1n}; R_{U21}, R_{U22}, \ldots R_{U2n}; R_{Um1}, \ldots R_{Umn}]$. Predictions 520 may be accomplished by maintaining mobility models of the physical disturbances and user nodes, or with any of the methods and techniques described above. Predictions 520 should identify at risk user nodes associated with radio links that are likely to experience a connection loss or a significant deterioration of link quality along with a time and duration during which the disturbance is likely to occur. In certain embodiments, the predictions are based not only on the currently received or determined positions of the user nodes $[P_{U1}, \ldots P_{Un}]$ and physical disturbances $[P_{D1}, P_{D2}, \ldots P_{Di}]$ but will also include any or all of the previously received user node positions and physical disturbances.

The user nodes associated with each predicted link disturbance, referred to herein as at risk user nodes $U^R$ are identified. An at risk user node $U^R$ is a user node that is likely or expected to experience a link disturbance, i.e. loss of connectivity or degradation of radio link performance, due to a physical disturbance interfering with the radio link between the at risk user node $U^R$ and the remote radio unit by which the at risk user node $U^R$ is being serviced. The collection of at risk user nodes $U^R$ may be represented in vector notation as $[U^R_1, U^R_2, \ldots U^R_k]$, where k represents the total number of at risk user nodes $U^R_1$.

Once one or more at risk user nodes $U^R$ have been determined, network or connectivity adjustments $[A_1, A_2, \ldots A_k]$ may be determined 522. The connectivity adjustments are configured to avoid loss or degradation of service provided to the at risk user nodes $[U^R_1, U^R_2, \ldots U^R_k]$ and maintain the expected QoS for each user node being serviced by the network. In the vector of network adjustments $[A_1, A_2, \ldots A_k]$ k represents the number of determined network adjustments where k may be equal to, greater than, or less than, the number of at risk user nodes. The determined network adjustments $[A_1, A_2, \ldots A_k]$ may include any appropriate adjustment to the wireless network such as the adjustments described above.

Finally, messages are sent 524 to appropriate entities in the wireless network with information necessary to implement the determined network adjustments $[A_1, A_2, \ldots A_k]$.

The messages can include instructions to initiate a hand off from one radio resource unit to another radio resource unit, for example.

Figure 6:
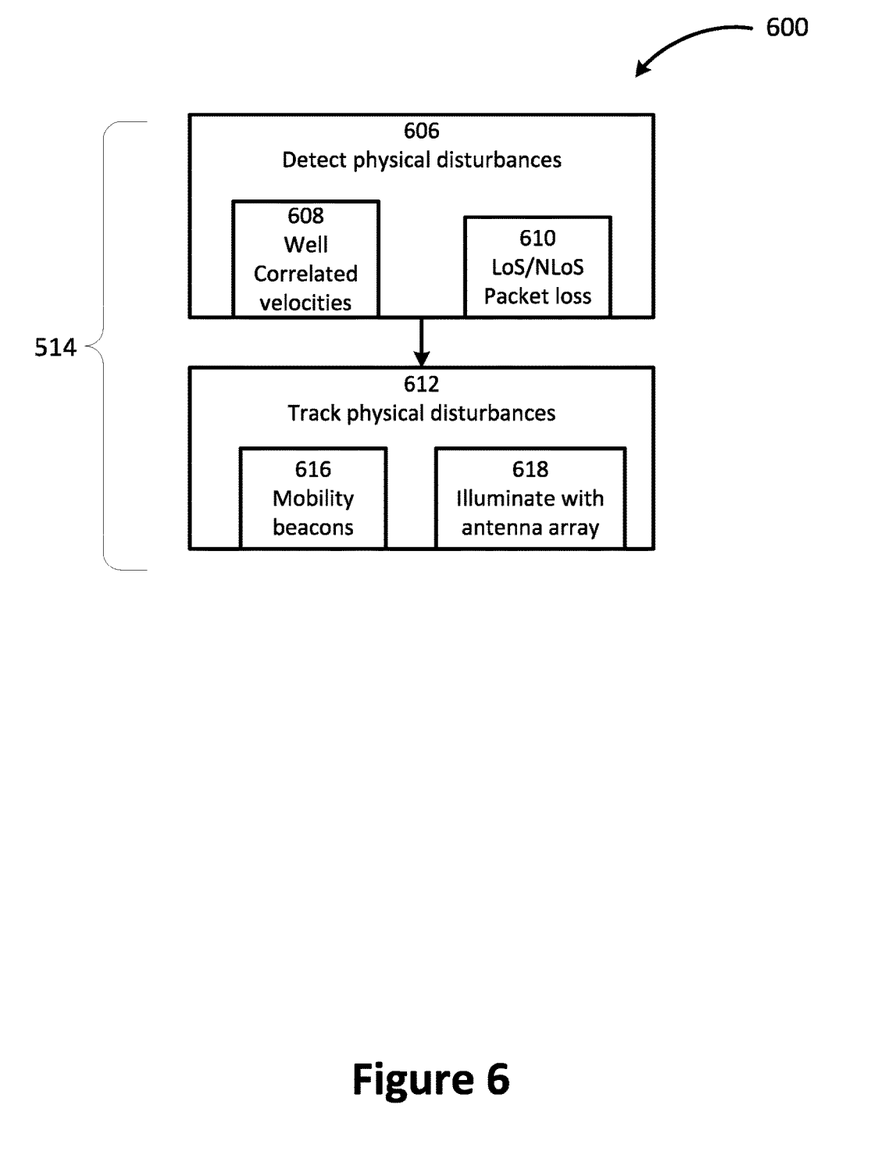
FIG. 6 illustrates a flow chart of an exemplary method for determining physical disturbances incorporating aspects of the disclosed embodiments.

FIG. 6 illustrates an exemplary method 600 for determining 514 physical disturbances as may be advantageously employed in the exemplary method 500 described above and with reference to FIG. 5. Physical disturbances [$PD_1$, $PD_2$, . . . $PD_i$] may be determined 514 as shown in the method 600 by detecting 606 the physical disturbances [$PD_1$, $PD_2$, . . . $PD_i$] and tracking 612 the detected physical disturbance. In certain embodiments, detection 606 of the physical disturbances [$PD_1$, $PD_2$, . . . $PD_i$] may be based on radio link measurements [$R_{U11}$, $R_{U12}$, . . . $R_{U1n}$; $R_{U21}$, $R_{U22}$, . . . $R_{U2n}$; $R_{Um1}$, . . . $R_{Umn}$] such as the radio link measurements [$R_{U11}$, $R_{U12}$, . . . $R_{U1n}$; $R_{U21}$, $R_{U22}$, . . . $R_{U2n}$; $R_{Um1}$, . . . $R_{Umn}$] received in step 502. Alternatively, detection 606 of the physical disturbances [$PD_1$, $PD_2$, . . . $PD_i$] may also be based on the user node positions [$P_{U1}$, . . . $P_{Un}$] received in step 504 described above.

The position of physical disturbances may be detected using various means. For example, as described above with reference to FIG. 3, when a group of user nodes are determined 608 to have well correlated velocities 608, it is possible that the group of user nodes are on a bus or other type of moving vehicle. As used herein the term "well correlated velocities" is used to refer to a group of user nodes which all have the same or substantially the same velocity. Changes or differences in velocities may be realized when a person on a bus takes their phone out of their pocket and lifts it to their ear or changes seats.

The group of user nodes with well correlated velocities may be identified for example by finding a group of user nodes whose average velocity is above a predetermined threshold velocity and where the velocity of all the user nodes in the group is within a predetermined velocity of the average velocity of the group. Alternatively, a physical disturbance could be detected by monitoring the disturbances it causes to the radio links. This may be done by detecting 610 radio links that lose LoS connectivity between a user node and an remote radio unit for a period of time or whose packet losses experience a significant change. The packet losses may be uplink packet loses, $PL^{UL}$, and or downlink packet losses, $PL^{DL}$, detected between a user node and the servicing remote radio unit.

In certain embodiments, it is desirable to track 612 the movements of detected physical disturbances [$PD_1$, $PD_2$, . . . $PD_i$] and of the user node. Tracking of the user node may be achieved through the use of mobility beacons 616 or through the use of illumination 618 with radio waves from antenna arrays and subsequently employing radar techniques to track the disturbance. Once user nodes of particular interest, such as a group of user nodes associated with a detected physical disturbance have been detected, messages [$M_1$, $M_2$, . . . ] may be sent to have these user nodes turn on their mobility beacons 616 if the user node are so equipped. Alternatively, access nodes having antenna arrays or multiple remote radio units may be instructed to illuminate 618 the physical disturbance with radio energy or radio waves and track the physical disturbance based on radar techniques.

The exemplary methods 500 and 600 may be repeated as desired to provide continuous and uninterrupted protection against link disturbances. The methods described above, such as the exemplary methods 500 and 600, may be implemented in a single node or entity which may be incorporated into a wireless network where it would be the responsibility of this entity to predict and adjust for radio link disturbances. However, those skilled in the art will readily recognize that the methods and apparatus disclosed herein may be implemented in a single computing apparatus or distributed among multiple computing apparatus, also referred to as entities or nodes, in a wireless network without straying from the spirit and scope of the aspects of the disclosed embodiments.

For example when an access node detects a potential moving physical disturbance, it can send a message to neighboring remote radio units with information about the potential moving physical disturbance. The information can include for example, the location and velocity of the disturbance. This information will allow for the tracking and network adjustment steps to be distributed among processing entities in a communications network.

Figure 7:
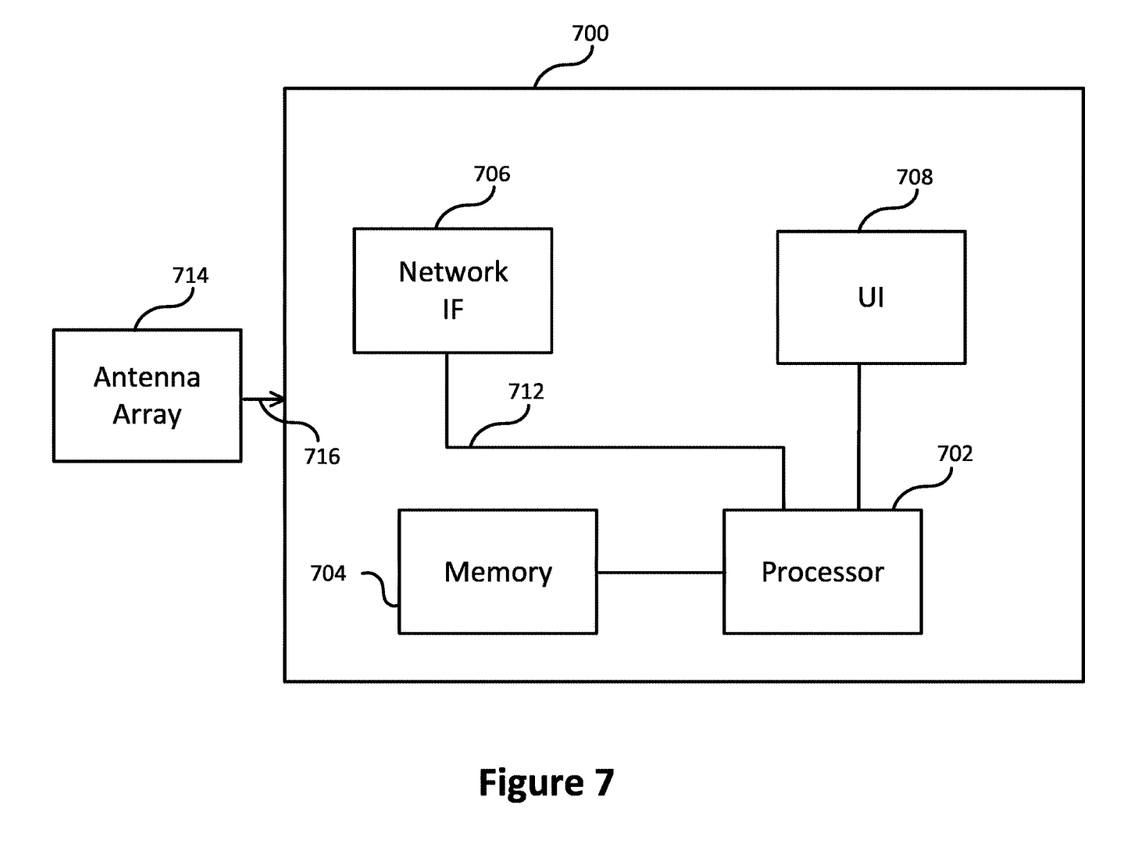
FIG. 7 illustrates a block diagram of a computing apparatus appropriate for implementing aspects of the disclosed embodiments.

FIG. 7 illustrates a block diagram of an exemplary computing device 700 appropriate for implementing aspects of the disclosed embodiments. The illustrated computing device 700 includes a processor 702 coupled to a computer memory 704, a network interface 706, and a user interface (UI) 708. The computing apparatus 700 is appropriate for use as a computing device, which in certain embodiments may be a node in a wireless communications system, and is appropriate for implementing any of the methods, such as the exemplary method 500 described herein.

The processor 702 may be a single processing device or may comprise a plurality of processing devices including special purpose devices, such as for example, digital signal processing (DSP) devices, microprocessors, specialized processing devices or general purpose computer processors. The processor 702 may be configured to implement any of the methods for adjusting user node connectivity described herein. In certain embodiments the processor may include a CPU working in tandem with a graphics processing unit (GPU) and may include a DSP to handle signal processing tasks. The processor 702 may also include one or more processing cores configured for parallel processing.

The processor 702 is coupled 712 to a memory 704 which may be a combination of various types of volatile and non-volatile computer memory such as for example read only memory (ROM), random access memory (RAM), magnetic or optical disk, or other types of computer accessible memory. The memory 704 stores computer program instructions that may be accessed and executed by the processor 702 to cause the processor to perform a variety of desirable computer implemented processes or methods such as for automatic proactive adjustment of user node connectivity.

The program instructions stored in memory 704 may be organized as sets or groups of program instructions referred to in the industry with various terms such as programs, software components, software modules, units, etc. Each module may include a set of functionality designed to support a certain purpose. For example, a software module may be of a recognized type such as an operating system, an application, a device driver, or other conventionally recognized type of software component. Also included in the memory 704 are program data and data files which may be stored and processed by the processor 702 while executing a set of computer program instructions.

In certain embodiments, the computing device 700 includes a network interface 706 coupled to the processor 702 and configured to communicate with other processing entities in a wireless communication network. The network interface may be of a standardized type, such as Ethernet, or may be specific to a particular network implementation. In certain embodiments, the network interface may include a radio frequency unit capable of communicating over a wireless communication network.

The UI 708 may include one or more user interface elements such as a touch screen, keypad, buttons, voice command processor, as well as other elements adapted for exchanging information with a user. The UI 708 may also include a display unit configured to display a variety of information appropriate for a computing device or mobile user equipment and may be implemented using any appropriate display type such as for example organic light emitting diodes (OLED), liquid crystal display (LCD), as well as less complex elements such as LEDs or indicator lamps. In certain embodiments, the display unit 710 incorporates a touch screen for receiving information from the user of the computing device 700. Alternatively, the computing apparatus may not include a UI 708 and may be configured to be controlled and administered remotely through the network interface 706.

In certain embodiments, the computing device may be configured as an access node in a wireless network and will be coupled to an antenna array 714. The antenna array 714 may be configured to illuminate 618, referring to FIG. 6, a moving physical disturbance with radio energy as described above and to receive 716 radio measurements as may be used for radio detection and ranging to track the illuminated moving physical disturbance.

Figure 8:
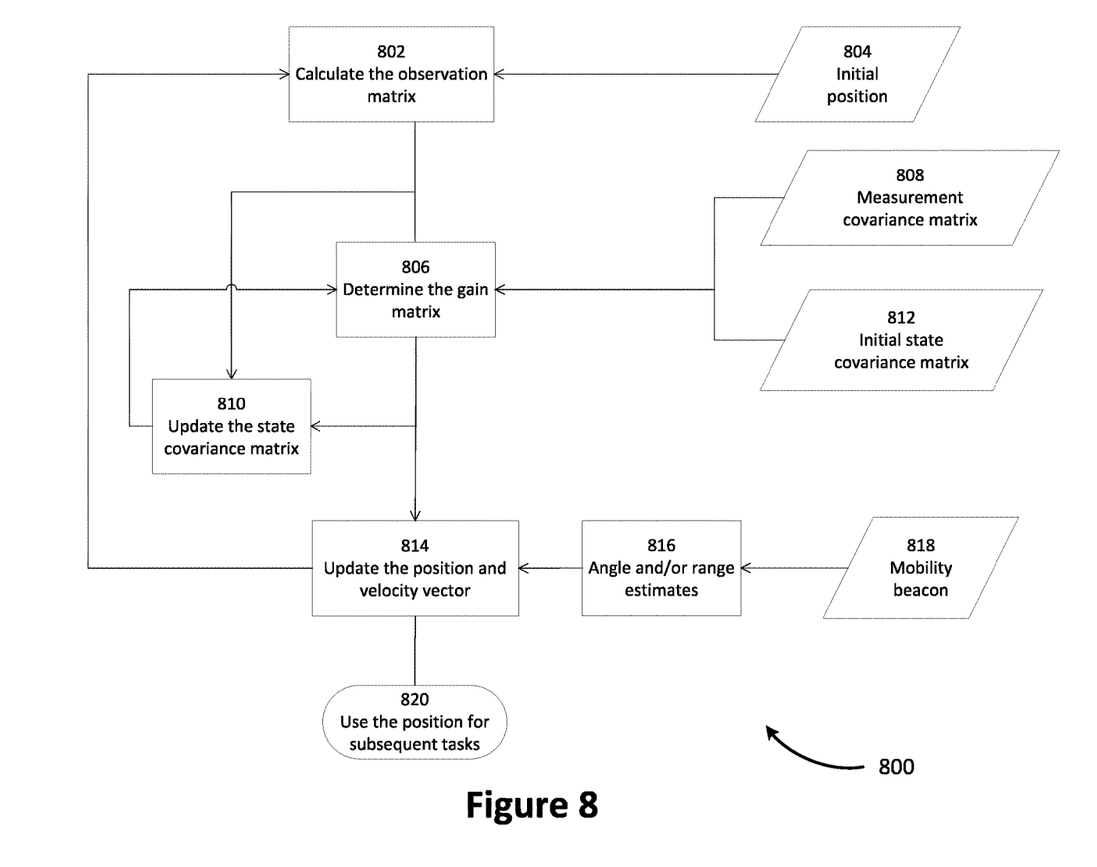
FIG. 8 illustrates a flow chart of an exemplary method for tracking and predicting positions and velocities incorporating aspects of the disclosed embodiments.

FIG. 8 illustrates a flow chart of an exemplary method 800 for using Kalman filtering to track and predict positions of user node and/or physical disturbances in a ultra-dense network. Kalman filtering, also referred to as linear quadratic estimation, is a recursive filter that estimates states of a linear quadratic system based on a set or series of noisy measurements. The exemplary method 800 begins by obtaining 804 initial position measurements of the user nodes being tracked. An observation matrix is calculated 802 based on the initial position measurements obtained 804. In subsequent iterations the observation matrix is calculated based on updated position and velocity vectors determined at step 814.

A gain matrix is determined 806 based on the observation matrix calculated at step 802 and the state covariance matrix that is updated at step 810. Determination 806 of the gain matrix is initialized based on a measurement covariance matrix input at step 808 and an initial state covariance matrix input at step 812.

Input from mobility beacons is received 818 and angle and/or range estimates are determined 816 based on the received 818 mobility beacons. The angle and/or range estimates 816 and determined 806 gain matrix and combined with a system model to update 814 the position and velocity of the user nodes or physical disturbances being tracked.

The state covariance matrix is updated 810 based on the calculated 802 observation matrix and the determined 806 gain matrix. The positions of the user nodes and physical disturbances may then be used 820 for subsequent tasks such as identifying at risk user nodes, determining connectivity adjustments or other functions that use position or predicted positions of the user nodes and physical disturbances as described above.

Figure 9:
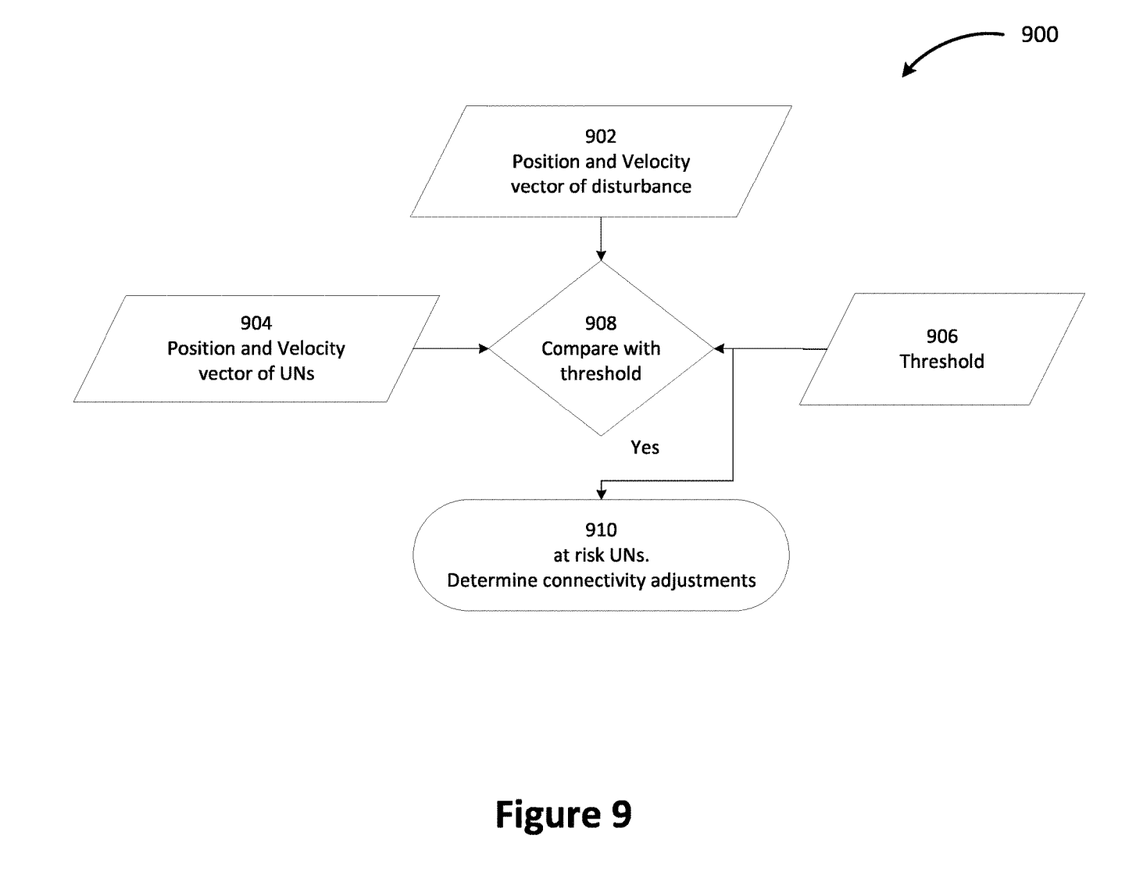
FIG. 9 illustrates a flow chart of an exemplary method for identifying at risk user nodes and determining connectivity adjustments incorporating aspects of the disclosed embodiments.

FIG. 9 illustrates an exemplary embodiment of a method 900 for combining various determined values to find at risk user nodes and determine appropriate connectivity adjustments for avoiding deterioration of user node connectivity. A position and velocity vector for user nodes is received at step 904. The position and velocity vector may be obtained using any of the above described methods such as through the use of mobility beacons and Kalman filtering as illustrated in the exemplary method 800 described above and with reference to FIG. 8. A position and velocity vector for moving physical disturbances is received at step 902. The positions and velocities of moving physical disturbances may be obtained using any of the above described methods.

Threshold values are received at step 906. The threshold values may be of various types such as for example a threshold representing a minimum velocity for groups of user node associated with physical disturbances such as physical disturbance 302 described above and shown in FIG. 3. The position and velocity vector of the user nodes 904, the position and velocity vector of the physical disturbances 902 are compared 908 with the threshold values 906. When the threshold values 906 are exceeded, the at risk user nodes are identified 910 and appropriate connectivity adjustments may be determined.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A computing apparatus, wherein the computing apparatus is a node in a wireless communication system, the computing apparatus comprising a processor, wherein the processor is configured to:

receive at least one radio link measurement, each of the at least one radio link measurement including a value indicative of a quality of a radio link between an access node of the wireless communication system and a user node;

determine a presence of a physical disturbance between the access node and the user node based on the at least one radio link measurement;

determine an at risk user node and a time at which the at risk user node is expected to experience a radio link disturbance due to the physical disturbance;

determine a connectivity adjustment for adjusting a connectivity of the at risk user node with the wireless communication system; and send a message including the determined connectivity adjustment to the wireless communication system.

2. The computing apparatus of claim 1, wherein the at least one radio link measurement includes an uplink radio link measurement, and a downlink radio link measurement from the user node.

3. The computing apparatus of claim 1, wherein the processor is configured to identify the physical disturbance as a moving physical disturbance (PDm) by identifying a group of user nodes having well correlated velocities, wherein an average velocity of the group of user nodes is greater than a predetermined threshold value.

4. The computing apparatus of claim 3, wherein the processor is configured to track the moving physical disturbance by sending one or more messages via the wireless communication system to at least a first user node of the group of user nodes, the messages comprising a request to the first user node to transmit at least one mobility beacon.

5. The computing apparatus of claim 1, wherein the processor is configured to determine the presence of the physical disturbance based on an uplink packet loss and/or a downlink packet loss between the user node and the access node.

6. The computing apparatus of claim 1, wherein the processor is configured to determine the presence of the physical disturbance based on detection of line of sight and non-line of sight radio link measurements between the user node and a remote radio unit of the access node.

7. The computing apparatus of claim 1, wherein the wireless communication system comprises an antenna array coupled to the access node, and the physical disturbance is a moving physical disturbance, and wherein the processor is configured to track the moving physical disturbance by:
   sending one or more messages to the access node requesting the access node to use the antenna array to illuminate the moving physical disturbance with radio waves; and
   tracking the moving physical disturbance based on monostatic or bistatic radar measurements received from the antenna array.

8. The computing apparatus of claim 1, wherein the processor is configured to adjust connectivity by connecting the at risk user node to a remote radio unit where a line of sight radio link between the at risk user node and the remote radio unit will be protected from disruption by the physical disturbance.

9. The computing apparatus of claim 1, wherein the processor is configured to increase a rate of channel state information measurements prior to a connectivity adjustment of the user node.

10. The computing apparatus of claim 1, wherein the processor is configured to adjust connectivity by adapting throughput and/or buffering data before a radio link disturbance occurs.

11. The computing apparatus of claim 1, wherein the processor is configured to adjust connectivity by adjusting one or more of the modulation and coding scheme, coding rate, and number of resource elements associated with the at risk user node.

12. The computing apparatus of claim 1, wherein the processor is configured to adjust connectivity by sending messages to the at risk user node requesting data traffic to be offloaded to an alternate radio access technology.

13. The computing apparatus of claim 1, wherein the processor is configured to, before the at least one radio link measurement is received, send measurement signals to nodes of the wireless communication system, wherein the measurement signals comprise the type of measurements to be taken, and wherein the type of measurements comprise one of an uplink radio measurement, a downlink radio measurement, and a signal to interference plus noise ratio.

14. The computing apparatus of claim 1, wherein the processor is configured to receive information regarding a position of the user node, and determine the physical disturbance based on the position of the user node with respect to a position of the access node.

15. A method for use in a wireless communication network, the method comprising:
   receiving at least one radio link measurement, each of the at least one radio link measurement including a value indicative of a quality of a radio link between an access node of the wireless communication network and a user node;
   determining a presence of a physical disturbance between the user node and the access node based on the at least one radio link measurement;
   determining, based on the physical disturbance, an at risk user node and a time at which the at risk user node is expected to experience a radio link disturbance due to the physical disturbance;
   determining a connectivity adjustment for adjusting a connectivity of the at risk user node with the wireless communication network; and
   sending a message including the determined connectivity adjustment to the wireless communication network.

16. The method of claim 15, comprising receiving information regarding a position of the user; and
   determining the presence of the physical disturbance includes determining the presence of the physical disturbance based on the position of user node with respect to a position of the access node.

17. A computer program product comprising non-transitory computer program instructions that when executed by a processing apparatus, cause the processing apparatus to perform the method according to claim 15.

18. The method of claim 15, wherein the determining the time at which the at risk user node is expected to experience the radio link disturbance on due to the physical disturbance includes determining a relative motion of the physical disturbance with respect to the at risk node.

19. The method of claim 1, wherein the processor is configured to determine the time at which the at risk user node is expected to experience the radio link disturbance on due to the physical disturbance by determining a relative motion of the physical disturbance with respect to the at risk node.

20. The method of claim 1, wherein the message is sent directly to the at risk user node and includes an instruction to offload data traffic to an alternate radio access technology or to initiate a handover to a new radio resource unit.

* * * * *